Aug. 30, 1932.  F. E. RILEY  1,874,627
GATE VALVE WITH NONPLUGGING SEAT CONSTRUCTIONS
Filed July 1, 1930
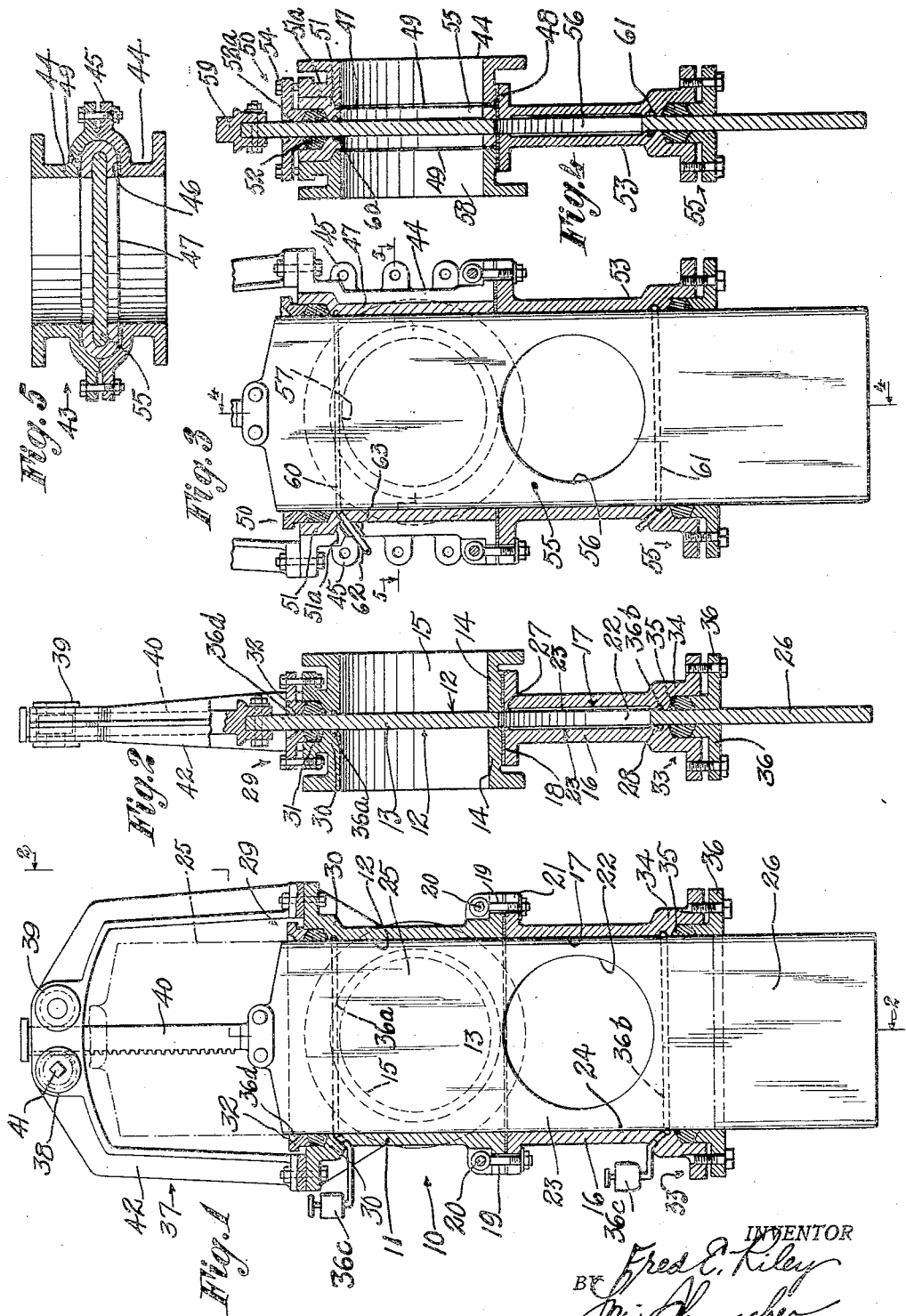
INVENTOR
Fred E. Riley
BY
ATTORNEY Patented Aug. 30, 1932

1,874,627

UNITED STATES PATENT OFFICE

FRED E. RILEY, OF LIVERMORE FALLS, MAINE

GATE VALVE WITH NONPLUGGING SEAT CONSTRUCTIONS

Application filed July 1, 1930. Serial No. 465,181.

This invention relates to gate valves.

One object of the invention is to provide a gate valve having an improved gate and seat construction, whereby the seat is prevented from becoming plugged at any part thereof.

Another object of the invention is to provide a valve wherein a gate has improved co-operation with the valve casing to avoid the necessity of using a bonnet.

Another object of the invention is to provide a gate valve having a renewable seat.

Another object of the invention is to provide a gate valve of the type mentioned having an improved extension to house projecting portions of the valve.

Other objects of the invention are to provide a gate valve having an improved gate which can be made of a plate; and wherein stuffing boxes are arranged in improved relation to make the valve tight and to simplify the valve construction, while being easily accessible for inspection and repair; and further, in which a stuffing box has improved relation with the casing extension; and wherein the operating means for the gate may coact therewith to protect a projecting part of the gate; and wherein the improved gate valve is made of relatively few and simple parts, comparatively inexpensive to manufacture and assemble, rugged and reliable in operation, efficient in use, and convenient in operation, and wherein a lubricating means is provided having improved association with the valve structure.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a view in vertical section of a device embodying the invention.

Fig. 2 is a vertical sectional view of the same taken on line 2—2 of Fig. 1.

Fig. 3 is a vertical sectional view of a modified form of the invention.

Fig. 4 is a vertical sectional view taken on line 4—4 of Fig. 3.

Fig. 5 is a horizontal sectional view taken on line 5—5 of Fig. 3.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

This invention provides a gate valve which can be used under various industrial conditions, in the manufacturing, and power plant, in sewage systems, for controlling the flow of solids, liquids or gases, under any desired pressures or temperatures. For example, advantage of the gate valve is obtained in the employment thereof on pulp stock in paper making. Another advantageous use of the gate valve is with sludge bearing liquids. In either case solids will not build up in the seat and under the gate as with the ordinary type of gate valve. The gate valve may be made of any suitable materials to withstand acid or other corrosive, or bad sulphurous conditions. For example, the body may be made of iron and the gate of bronze, or a lead body bronze gate may be utilized.

Generally described, the invention provides a body made of one or more pieces, and having a valve seat extending completely therethrough to receive a gate having substantially parallel faces. This gate may be constructed of the requisite thickness or strength, and when made of a relatively thin sheet metal, may have re-enforcement elements or guides secured thereto, if desired. Formed in the gate is a suitable valve opening or orifice, beyond which the gate includes a closure portion. This closure portion may be at one or at opposite sides of said opening, and disposed in any suitable relation with respect to the direction of movement of the gate. To properly house and protect the orifice portion of the gate in the closed position thereof, the main casing may have an extension. A stuffing box may be provided at the end of the extension in constant engagement with an end portion of the gate in open and closed position of the latter.

Another stuffing box may be provided for the gate on the main casing remote from the extension. Thus the valve casing is properly sealed, and the stuffing boxes are easily accessible. The extension which may be made of one or more pieces, can be constructed integral with or separate of the main casing, and having fluid tight relation therewith by packing or in any other suitable manner. If desired, a renewable seat made in one or more pieces may be provided for the gate and positioned in any desired relation therein, as, for instance, in the main casing alone, into which it may be inserted laterally or from an end, and suitably engaged or packed in fluid tight relation. The main casing stuffing box may be arranged as heretofore suggested, or in the adjacent portion of the renewable seat itself.

As the valve moves through the stuffing boxes, the same may be made of a suitable size and filled with a suitable material to readily withstand the frictional contact. Lubricant may be supplied to the boxes in any well known manner, although it will ordinarily suffice to supply a proper packing thereto, which may consist of a composition material, such as rubber, asbestos, graphitic lubricant, or other packing, or combination of ingredients, according to operating conditions of temperature, pressure, chemical activity of the material controlled by the valve, frequency in operation of the valve. Preferably, however, the lubricant is provided through grooves so associated as to flow readily onto the gate and to be properly distributed thereon, these grooves being in relative proximity to the stuffing boxes and between the latter.

Under low pressure conditions, a sheet packing may be used for the valve casing structure and extension. In fact, machine leaded joints may suffice for the casing. For pressures up to fifty pounds, a good seating connection is satisfactory, while for higher pressures, a ring packing may be used.

Referring in detail to the drawing, 10 denotes a gate valve embodying the invention. The same includes a main casing 11 which may be of one piece construction, being made in the form of a sleeve to provide a tubular seat 12 for a gate 13. The main casing has flanged portions 14 providing a passage 15 transverse to said seat.

Connected to the main casing in alinement therewith is an extension 16 which may be of one piece construction, being in the form of a flattened sleeve having an opening 17 registering with the seat 12 of the main casing. Interposed between the main and extension casings may be any suitable packing 18, and the connection referred to may be of any suitable type, as, for instance bolts 19 pivotally mounted at 20 to engage flange 21 of the extension.

The gate 13 may consist of a relatively large rectangular plate whose total length may be at least three times the diameter of the gate opening or orifice 22. This gate may have faces 23 of any suitable shape to engage the seat 12, but are preferably in parallelism. The gate may thus be inexpensively constructed of a simple flat plate of plane and uniform characteristics, although it can also be smoothened, machined, or ground to produce any desired close fit with the valve seat. The edges of the gate may be rounded as at 24. The gate thus contacts the seat 12 at both faces thereof, although it may more snugly contact one of the seat faces under the pressure of a fluid acting on the gate.

The gate which extends completely through the main casing and the extension includes a pair of closure portions 25, 26 at opposite side of the orifice 22. The portion 25 constitutes the valve closure, while the portion 26 closes the extension, preferably in co-operation with a stuffing box as hereinafter described. As the gate passes through the stuffing box, the closure portion affords a constant area for uniform bearing relation with the packing in the stuffing box in every position of the gate.

The opening 17 of the extension may have snug sliding contact with the gate at points 27, 28, the part intermediate said points being recessed as shown not only to minimize machining but also to obtain a more reliable and uniform movement of the gate.

Formed in the main casing remote from the extension is a stuffing box 29. The same includes an outwardly offset or flared portion 30 receiving the packing 31 which is compressed by the gland 32. As thus constructed, the stuffing box extends completely around the gate with the packing in tight contact therewith, and the gate is movable centrally through the stuffing box.

At the end of the casing extension 16, is a similar stuffing box 33 formed in a recessed portion 34 of the extension, for receiving packing 35 compressed by a gland 36. Thus any fluid which might enter the extension 16 from the main casing will be prevented from leaking out.

Thus the gate is at all times in contact and in closure coaction with both stuffing boxes 29 and 33, whether the valve be open or closed.

In the closed position of the valve, it is seen that the orifice portion of the gate is properly housed and protected in the extension 16, while the extension closure gate portion 26 projects from the extension. The part 26 may, however, be protected as desired.

When the valve is open, the valve closure portion 25 of the gate projects from the main casing while the extension closure portion 26 is substantially housed in the extension, and, of course, in engagement with stuffing box 33.

While lubricant may be supplied in any suitable manner to the stuffing boxes, it is preferred to provide a separate means for this purpose to lubricate the gate to any desired degree, and without requiring undue pressure. Therefore grooves such as 36a and 36b are provided adjacent to but spaced inward with regard to the respective stuffing boxes 29 and 33. Thus the stuffing boxes act as a sealing means to prevent loss of lubricant out of the valve both in an upward and downward direction. Not only can the gate be more easily moved, but the packing in the stuffing boxes is preserved by the lubricant. The lubricant may be supplied in any desired manner as by cups 36c, and the pressure on the lubricant is independent of and may be considerably less than the pressure in the stuffing boxes. In starting the gate downward for the first time, lubricant may also be supplied externally to a recess 36d in the gland 32.

To operate the valve, any suitable means may be employed, well known in the art, one possible form of which is shown. This may include a frame 37 mounted on the main casing and carrying a pinion 38 and opposed idler 39 between which is received a rack bar secured to the gate, and the teeth of which rack bar mesh with those of the pinion. By turning the pinion, for example, at the shaft 41 thereof, the valve may be opened or closed.

To cause the frame 37 to protectively cooperate with the portion 25 in the open position of the gate, the frame may be made in the shape of a yoke, or equivalent, with broad, ribbed arms 42 to partially enclose said portion.

In Figs. 3 to 5 is shown a modification of the invention which may be similar to the preceding form of the invention, except that it is provided with a renewable seat. Specifically, the valve body or casing 43 may consist of one or more parts 44 which can be bolted or otherwise secured together as at 45. Between the parts 44 is provided a flat tubular space 46 for receiving the renewable seat 47 which is of corresponding sleeve form. This renewable seat terminates at 48 in the bottom of the main casing 43 and extends into the top thereof. Packing 49 may be employed to make a tight connection. At its upper end the renewable seat may be provided with a stuffing box 50 formed therein at 51 to receive packing 52 acted on by gland 52a. The main casing may have a recess 51a to receive the box 51.

At the lower end of the main casing is an extension 53 constructed like the one hereinbefore described, and having bearing coaction with the lower edge of the renewable seat. A stuffing box 55 is formed at the bottom of the extension as hereinbefore described. As the bolts 54 acting on the gland 52 engage the main casing 43, pressure is exerted thereby on the renewable seat to hold the same in the main casing, and also in bearing contact with the extension.

Received in the renewable seat is a gate 55 similar to that shown in Fig. 2, and seating snugly in the renewable seat, for effecting closure of the valve. This gate also has an orifice 56 adapted to register with alined openings 57 in the renewable seat and with the transverse passage 58 in the main casing. Any suitable mechanical means, which may be the same as previously described, may be connected to the gate at 59 to operate the valve.

To lubricate the gate, separate continuous grooves 60, 61 may be provided similar to those hereinbefore described, the former being in the renewable seat and the latter in the extension casing. The groove 60 communicates with a tube 62 extending through a recess 63 formed in the meeting portions of the members 44. Lubricant may be supplied in any suitable manner to the grooves.

It will be appreciated that various changes and modifications may be made in the device as shown in the drawing, and that the same is submitted in an illustrative and not in a limiting sense, the scope of the invention being defined in the following claims.

I claim:

1. A device including a gate valve, a casing therefor, said casing including a main section, an extension section at one end thereof, and actuating means for operating the valve at the opposite end of the main section, the main section having a transverse passage and the gate valve having an orifice approximately centrally disposed between its ends for communicating with the passage, the extension section having a through opening for receiving a portion of the gate valve, the gate valve being of a length at least three times the diameter of the orifice so as always to extend fully through the extension section, and the gate valve being so disposed that in the closed position thereof, the orifice is disposed in the extension section and one end portion of the gate valve extends fully through the main section, and packing means at the opposite free ends of the casing continuously engaging the gate valve.

2. A valve including a gate, a casing therefor, said casing including a main section and an extension section, said main section having a transverse passage, said gate having an orifice for communication with said passage, said main section having a seat for the gate extending completely therethrough, packing means for the gate at the remote free ends of said sections, and lubricating channels in said sections for the gate, said channels extending around the gate, transversely thereof and in proximity to the packing means but inward of the same.

In testimony whereof I affix my signature.

FRED E. RILEY.